ative material can occur and substantial olefin side reactions, which diminish the yield of desired product, may also occur. Selected polymerization pressures can range from atmospheric pressure or even less to relatively high pressures, such as 1000, 2000, 5000 or 20,000 p.s.i.g. or even more, depending upon the volatility of the selected olefin feed stock and the character of the principal product which is desired.

2,898,326

POLYMERIZATION OF OLEFINS WITH A CATALYST COMPRISING A HYDRIDE OF BORON AND AN OXIDE OF A METAL OF GROUP 6A

Edwin F. Peters, Lansing, and Bernard L. Evering, Chicago, Ill., assignors to Standard Oil Company, Chicago, Ill., a corporation of Indiana No Drawing. Application May 2, 1955
Serial No. 505,517

23 Claims. (Cl. 260—88.1)

This invention relates to a novel catalytic process for the polymerization of olefins. The novel catalytic process of our invention finds desirable application in the polymerization of terminal vinyl olefins, i.e. olefins in which one end group is $=CH_2$. In one specific aspect, our invention is concerned with novel catalytic processes for the preparation of hydrocarbon materials of high molecular weight from terminal vinyl olefins. A commercially desirable application of our invention is in the catalytic processing of normally gaseous olefins to produce normally solid hydrocarbon materials, especially polymers which are oriented or relatively crystalline and are characterized by relatively high densities, tensile strength, toughness and excellent machinability.

One object of our invention is to provide novel catalysts for the polymerization of olefins, e.g. terminal vinyl olefins. Another object is to provide novel catalysts which are effective in the conversion of ethylene, propylene, 1-butene or isobutene to high molecular weight polymers or copolymers at desirable rates in high yields. An additional object is to provide a novel catalytic process for the preparation of relatively high density, relatively crystalline polymers from olefinic materials. A further object is to provide novel catalytic processes for olefin polymerization. Yet another object is to provide a catalytic system which will induce the polymerization of propylene at previously unattainable rates to produce normally solid polymers. Yet another object is to provide novel catalytic processes for the copolymerization of normally gaseous olefins to produce normally solid hydrocarbon materials. These and other objects of our invention will become apparent from the ensuing description thereof.

Briefly, in accordance with our invention, an olefinic material (usually a mono-olefinic hydrocarbon) is contacted with a catalytic material prepared by bringing together diborane or other hydrides of boron and a solid material comprising essentially an oxide of a metal of Group 6a of the Mendeleef Periodic Table, namely, an oxide of chromium, molybdenum, tungsten or uranium (lefthand subgroup of group 6). The olefin and the catalytic material derived from the hydride of boron and group 6a metal oxide are contacted under conditions of temperature, pressure, time, etc. sufficient to effect substantial conversion of said olefin to a polymer or copolymer thereof with added copolymerizable material. It will be understood that the optimal reaction conditions will be varied in accordance with the character and reactivity of the olefin feed stock, catalysts, nature of the polymer products which are sought, etc.. In general, temperatures between about −20° C. and about 250° C. can be used. Usually considerations of convenience and efficiency indicate the use of temperatures in the range of about 0° C. to about 200° C. At temperatures below the specified range, the rates of olefin polymerization can be quite low; at temperatures above the specified range, considerable destruction of the boron hydride component of the cataly- Normally gaseous alkenes can be converted by the catalysts of our invention to normally solid hydrocarbon materials even at atmospheric pressure. However, higher rates of polymerization or copolymerization can be obtained at superatmospheric pressures. In some instances, the yield of high molecular weight polymers derived from normally gaseous alkenes is greater at higher pressures. The polymerization process of our invention is desirably effected in the presence of a liquid hydrocarbon reaction medium, for example, a saturated hydrocarbon such as n-heptane, n-octane, iso-octane, etc., or a relatively low boiling monocyclic aromatic hydrocarbon such as benzene, toluene, xylenes or the like. However, the polymerization operation can be effected in the absence of a liquid reaction medium and the catalyst containing accumulated solid hydrocarbon materials can be treated from time to time, within or outside the polymerization zone, to effect removal of conversion products therefrom and, if necessary, reactivation or regeneration of the catalyst for further use.

The boron hydride used in preparing our catalytic compositions is usually diborane ($B_2H_6$), although other hydrides of boron can also be used. Some of the hydrides of boron such as $BH_3$, $B_4H_{10}$, $B_5H_{11}$ and $B_6H_{12}$ are relatively unstable materials and decompose under ordinary conditions to produce various polymeric hydrides of boron. However, with suitable precautions, they may be used in the preparation of catalytic materials for our invention. The relatively stable boron hydrides are diborane, pentaborane ($B_5H_9$), hexaborane ($B_6H_{10}$), and decaborane ($B_{10}H_{14}$). Because of its high catalytic efficiency and relative ease of preparation, we prefer to employ diborane in the preparation of catalytic materials for the purposes of our invention.

The metal oxide components of our catalysts are derivatives of metals of Group 6a of the Mendeleef Periodic Table and may be used alone or in admixture with each other. Mixed oxides or complex oxygen compounds of group 6a metals can also be employed in the present process. Thus, in addition to the group 6a metal oxide, the catalysts may comprise oxides of copper, tin, zinc, nickel, cobalt, vanadium, niobium, tantalum, titanium, zirconium, etc. Mixed metal oxide catalysts can readily be made by calcining the desired metal salts of oxy acids of group 6a metals, wherein the group 6a metal appears in the anion, for example, salts of molybdic acid and the like.

The group 6a metal oxide can be used alone or extended upon a suitable support (having surface areas, for example, between about 1 and about 1500 square meters per gram), for example, activated carbon; the difficulty reducible metal oxides such as gamma-alumina, magnesia, titania, zirconia, silica or their composites, e.g., synthetic aluminosilicates, clays and the like. In some instances it may be desired to employ a relatively low surface area support, of which a variety are known in the art, including tabular alumina, various fused silicates, silicon carbide, diatomaceous earths; various metals, preferably treated to produce a relatively thin surface coating of the corresponding metal oxide thereon, such as iron or steel containing a slight iron oxide coating or aluminum carrying a surface coating of aluminum oxide, e.g., as an anodized aluminum. We may also employ relatively high surface area, relatively non-porous supports or carriers for the group 6a metal oxide such as kaolin, zirconium oxide, iron oxide pigments, carbon black or the like.

The catalyst support may comprise or consist essentially of suitable metal fluorides, particularly the fluorides of alkali metals, alkaline earth metals, Al, Ga and In. High melting fluorides which are only slightly soluble, at most, in water are preferred. A particularly desirable type of catalyst support comprises or consists essentially of $AlF_3$. The group 6a metal oxide can be co-precipitated with or impregnated on a gelatinous slurry of hydrated $AlF_3$ and the composite catalyst can then be calcined prior to use.

The relative proportion of support to the catalytic metal oxide is not critical and may be varied throughout a relatively wide range such that each component is present in amounts of at least approximately 1 weight percent. The usual metal oxide:support ratios are in the range of about 1:20 to 1:1, or approximately 1:10. We may employ metal oxide catalysts composed of a supporting material containing about 1 to 80%, preferably about 5 to 35%, or approximately 10%, of molybdena or other group 6a catalytic metal oxide supported thereon.

The group 6a metal oxide can be incorporated in the catalyst support in any known manner, for example, by impregnation, coprecipitation, co-gelling and/or absorption techniques or other methods which are well known in the art of catalyst preparation. It may be desired to confine the group 6a metal oxide almost completely to a surface film on the support, rather than to achieve deep penetration of the support with 6a oxide catalyst, in order to minimize mechanical disintegration of the catalyst by solid polymer.

The group 6a metal oxide catalysts can be employed in various forms and sizes, e.g., as powder, granules, microspheres, broken filter cake, lumps, shaped pellets, as a coating on the reactor wall, etc. A convenient form in which the catalysts can be employed is as granules of about 20–100 mesh/inch size range.

In order to maximize the catalyst activity and reduce the requirements of the boron hydride, it may be desired to effect partial reduction of catalysts comprising hexavalent group 6a metal oxides before use in the polymerization process. The partial reduction and conditioning treatment of the solid metal oxide catalysts is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from subatmospheric pressures, for example even 0.1 pound (absolute), to relatively high pressures up to 3000 p.s.i.g., or even more. The simplest reducing operation can be effected with hydrogen at about atmospheric pressure.

Reducing gases such as carbon monoxide and sulfur dioxide may be used under substantially the same conditions as hydrogen. Dehydrogenatable hydrocarbons are usually employed at temperatures of at least about 450° C. and not above 850° C. Examples of dehydrogenatable hydrocarbons are acetylene, methane and other normally gaseous paraffin hydrocarbons, normally liquid saturated hydrocarbons, aromatic hydrocarbons such as benzene, toluene, xylenes and the like, normally solid polymethylenes, polyethylenes or paraffin waxes, and the like.

The proportion of group 6a metal oxide catalyst (including support), based on the weight of the olefin charging stock, can range upwardly from about 0.001 weight percent to 20 weight percent or even more. In a polymerization operation carried out with a fixed bed of catalyst, the catalyst concentration relative to olefin can be very much higher. The efficiency of the group 6a metal oxide catalysts is extremely high when used with boron hydride, so that said metal oxide catalysts can be employed in small proportions, based on the weight of charging stock, while maintaining high conversion efficiency.

We have observed that the group 6a metal oxide appears to absorb or adsorb the hydride of boron which is contacted therewith and it appears that this absorbate or adsorbate is the practical catalytic entity. The adsorption or absorption of the hydride of boron on the group 6a metal oxide occurs with great facility over an extremely broad temperature range, for example, a temperature range between about −100° C. to +100° C. or even higher temperatures, although at the higher temperatures, decomposition of relatively unstable hydrides of boron is far advanced and even decomposition of diborane occurs. Even at relatively moderate adsorption temperatures such as room temperatures or lower, there is a possibility that diborane or other hydrides of boron undergo reaction at the surface of the group 6a metal oxide to produce lower boranes, for example, $BH_3$, or higher polymeric boranes or both; or even that heterolytic fission of polyboranes may occur to produce reactive ions. It should be understood, however, that we are in no way bound by the theoretical considerations herein advanced.

The weight ratio of the hydride of boron to the group 6a metal oxide can be varied over an extremely broad range, for example, between about 0.0001 and about 10. The hydride of boron may be used in proportions between about 0.001 and about 10 weight percent, based upon the weight of the olefin charging stock.

A preferred class of olefin charging stocks are the normally gaseous alkenes, although the invention can be applied to olefins of higher molecular weight and to olefinic materials containing more than one unsaturated grouping and/or non-hydrocarbon substituents such as chloro-, halo-, cyano-, alkoxy-, etc.

Various co-monomers can be charged with the normally gaseous alkene feed stocks, for example, t-butylethylene, conjugated diolefinic hydrocarbons such as butadiene, isoprene, and the like; styrene, Ar-alkyl styrenes; various vinyl compounds such as tetrafluoroethylene, perfluorovinyl chloride and the like. When co-monomers are employed with the principal charging stock, their proportion may range between about 1 and about 25% by weight, based on the weight of the principal olefin charging stock, such as ethylene.

Acetylene or carbon monoxide may be added to the reactor in proportions between about 1 and about 20 mol percent, based on the boron hydride in order to control the molecular weight ranges of the solid polymers produced by our process.

The normally gaseous alkene or other olefinic charging stock can be polymerized in the absence of an added liquid medium, but it is highly desirable to effect polymerization in the presence of a substantially inert liquid reaction medium which functions as a partial solvent for the monomer, which may function as a solvent for the hydride of boron and which also functions as a liquid transport medium to remove normally solid polymerization products as a dispersion in said medium from the polymerization reactor, thus permitting efficient and continuous polymerization operations.

Particularly suitable liquid reaction media are various classes of hydrocarbons or their mixtures which are liquid and substantially inert under the polymerization conditions of the present process. Certain classes of aliphatic hydrocarbons can be employed as a liquid hydrocarbon reaction medium in the present process. Thus we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as propane, butanes, n-pentane, n-hexane, 2,3-dimethylbutane, neohexane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

Members of the aromatic hydrocarbon series, particularly the mononuclear aromatic hydrocarbons, viz., benzene, toluene, xylenes, mesitylene and xylene-p-cymene mixtures can also be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

We may also employ a liquid hydrocarbon reaction medium comprising liquid olefins, e.g., n-hexenes, cyclohexene, octenes, hexadecenes and the like.

The liquid hydrocarbon reaction medium should be freed of poisons before use in the present invention by acid treatment, e.g. with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

Temperature control during the course of the polymerization process can be readily accomplished owing to the presence in the reaction zone of a large liquid mass having relatively high heat capacity. The liquid hydrocarbon reaction medium can be cooled by heat exchange inside or outside the reaction zone.

It is desirable to minimize or avoid the introduction of water, oxygen, carbon dioxide, or sulfur compounds into contact with the catalytic material. Any known means may be employed to purify the olefinic charging stocks of these materials prior to their introduction into the polymerization reactor.

The contact time or space velocity employed in the polymerization process will be selected with reference to the other process variables, catalysts, the specific type of product desired and the extent of olefin conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually between about 0.1 and about 10 volumes, preferably about 0.5 to 5 or about 2 volumes of olefin solution in a liquid reaction medium. The amount of olefin in such solutions may be in the range of about 2 to 50% by weight, preferably about 2 to about 15 weight percent or, for example, about 5 to 10 weight percent.

The polymerization or copolymerization operations can be effected in standard equipment and by known polymerization techniques, for example, by the use of fixed bed processes, slurry processes, reactions in tubular converters wherein the catalyst is packed in a tube or annulus, polymerization in tubular converters wherein the Group 6a-boron hydride catalyst composition constitutes a lining on the wall of the reactor, moving catalyst bed processes, etc., as will be apparent to those skilled in the art. The hydride of boron may be introduced into the reactor before, during or after the introduction of the olefin feed stock and intermittent or continuous addition thereof may be practiced during the course of the polymerization operation.

The following specific examples are introduced as illustrations of our invention and should not be interpreted as an undue limitation thereof. The ethylene employed in the polymerization reactions was a commercial product containing oxygen in the range of about 15 to 50 p.p.m. The benzene employed in some of the examples was a commercial product of analytical grade, free of thiophene, dried before use by contact with sodium hydride.

*Example 1*

A catalyst of 20 wt. percent $Cr_2O_3$ supported on activated alumina was thoroughly dried by heating at 540° C. for 12 hours at atmospheric pressure. A 183 ml. stainless steel rocking reactor was charged with 10 g. of the chromia-alumina catalyst, 44 g. of dried benzene and 2 g. of diborane (prepared by the reaction of boron fluoride etherate with lithium borohydride). The reactor was then pressured with ethylene and the temperature was raised from room temperature to 141° C. over the course of 6 hours. The initial pressure was 300 and the maximum was 900 p.s.i.g. Some pressure drop occurred at room temperature, indicating that the reaction had already started. As the pressure dropped due to ethylene polymerization, additional ethylene was pressured in to maintain the pressure between 600 to 900 p.s.i.g. After 6 hours, the reactor was cooled to room temperature and gases were vented. The reactor was opened, liquids were filtered from solids and the chromia catalyst containing occluded solid polymer was extracted with boiling xylenes. The polymer was separated from xylenes by cooling, which caused its precipitation. The liquid products were distilled and it was found that none of the ethylene had been converted to liquid products. The xylenes extraction yielded 8.2 g. of a white, tough solid polymer having a melt viscosity of $4 \times 10^7$ poises (method of Dienes and Klemm).

*Example 2*

The rocking autoclave was charged with a commercial cobalt molybdate catalyst having the composition 3 wt. percent CoO, 8 wt. percent $MoO_3$ and the remainder activated alumina. The catalyst was partially prereduced in situ with hydrogen at 455° C. and 1000 p.s.i.g. of hydrogen pressure for 2 hours. The reactor was then charged with 44 g. of dried benzene, 3 g. of diborane and 76 g. of propylene. Pressure drop was found at 30° C. and the reaction was allowed to proceed at this temperature for 17 hours. The initial pressure was 160 p.s.i.g., dropping to 50 p.s.i.g. The reaction products were worked up as in Example 1. It was found that 4.9 g. of liquid products boiling above 200° C. and 3.1 g. of solid polymer were produced. The solid polymer was obtained in two fractions. The first fraction of 1.8 g. was precipitated from the hot xylenes solution by cooling from 137° C. to 28° C. This fraction was found to have a density (24/4° C.) of 0.9586, indicating that it contained a high proportion of crystalline material, its density being well above the density of commercial polyethylenes (about 0.92). The melt viscosity of this first fraction was $1.65 \times 10^7$ poises (method of Dienes and Klemm). The second fraction of solid polymer was obtained from the remaining solution by adding acetone as the anti-solvent at 28° C. The weight of the second fraction was 1.3 g. and its density (24/4° C.) was 0.8627, indicating that it was substantially entirely an amorphous high molecular weight polymer of propylene. The melt viscosity of the second solid polymer fraction was $2.60 \times 10^6$ poises and its specific viscosity ($\times 10^5$) was 31,800 (determined in xylenes at 0.125 g. per 100 ml. at 110° C.).

*Example 3*

The process of Example 1 is repeated but an equal weight of 8 wt. percent $MoO_3$ supported on activated alumina is substituted for the chromia-alumina catalyst of Example 1. The products are worked up as in Example 1 to separate the solid polymer of ethylene which is produced.

*Example 4*

The olefinic feed stock is a mixture of ethylene and 20 wt. percent thereof of propylene. The catalyst is 10 wt. percent of molybdenum trioxide supported upon zirconia. The 183 ml. stainless steel rocking reactor is charged with 15 g. of the $MoO_3$—$ZrO_2$ catalyst and 50 g. of dried n-heptane and the contents of the reactor are then chilled to 0° C. Two grams of liquid pentaborane ($B_5H_9$) are introduced beneath the liquid surface, the head is fitted on the reactor, and ethylene and propylene are charged to an initial pressure of about 200 p.s.i.g. Agitation is started and the contents of the reactor are allowed to warm up until pressure drop sets in. Depending on the rate of reaction desired and the specific product distribution, the reaction can be readily carried out at temperatures between about 30° C. and about 150° C., with corresponding pressures in the range of about 200 to about 1000 p.s.i.g. The olefinic charging stock is repressured into the reactor from time to time as the previous charge is consumed in polymerization, to a total of 25 g. The reaction products are worked up as before to separate normally solid polymers of high molecular weight.

*Example 5*

The process of Example 1 is repeated but 1-butene is substituted for the ethylene feed stock and the corresponding pressures may range from about 20 to about 500 p.s.i.g. The solid polymeric products are worked up as in Example 1.

*Example 6*

The 183 ml. stainless steel rocking reactor is charged with 10 g. of a commercial 8 wt. percent $MoO_3$-activated alumina catalyst, 50 g. of dried iso-octane, 2 g. of diborane and is pressured with isobutylene to an initial pressure of at least 20 p.s.i.g. at 30° C. Isobutylene is repressured into the reactor as it is consumed or intermittently, to a total of 30 g. The temperature of the reactor contents may be gradually raised to about 100° C. with a corresponding increase in the pressure to about 500 p.s.i.g. The products are worked up as in Example 1.

*Example 7*

The process of Example 1 is repeated but styrene is substituted for ethylene. The initial styrene charge is 5 g. and may be replenished as the styrene is consumed in polymerization. The products are worked up as in Example 1.

*Example 8*

The rocking reactor is charged with 10 g. of 20 wt. percent of $WO_3$ supported on a zirconia support, 50 g. of n-octane, 1 g. of diborane and 5 g. of liquid 1,4-butadiene at $-20°$ C. The autoclave is rocked and heated to initiate reaction, which may be effected at about 30° C. under a pressure of about 40 p.s.i.g., although higher temperatures up to about 100° C. may be used with pressures extending to about 700 p.s.i.g. Butadiene is repressured into the reactor as it is consumed by polymerization, to a total of 25 g. The products are worked up as in Example 1.

Although our invention has been illustrated and described with specific reference to certain olefinic charging stocks, it will be understood that it is not thus limited and, in fact, it may be broadly applied to the polymerization of a large number and variety of olefinic materials.

The normally solid polymers produced by the process of this invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkalates or "greases." The solid polymers may be employed as coating materials, gas barriers, binders, etc. to even a wider extent than solid polymers made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes, such as paraffin or petrolatum waxes, with ester waxes, with high molecular weight polybutylenes, and with other organic materials. Small proportions between about .01 and about 1 percent of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, provided by the present invention, can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected. The polymers of our invention can also be irradiated by high energy X-rays (about 0.5 to 2.5 mev. or more) or by radioactive materials to effect cross-linking, increases in softening temperature, etc.

The hydrides of boron can be employed jointly with oxides of metals of group 8, such as nickel, iron, cobalt, platinum, rhodium, etc.; oxides of metals of group 3, for example, boron, aluminum, gallium, indium, rare earth metals; oxides of metals of group 4a, for example, titania, zirconia, etc., the polymerization catalysts, process and processing conditions being otherwise unchanged from their counterparts herein described. The lower boron alkyls, especially boron trimethyl, can be used together with or in lieu of boron hydrides.

Having thus described our invention, what we claim is:

1. In a process for the production of a normally solid hydrocarbon material, the steps which comprise effecting initial contacting of a normally gaseous olefin with a hydride of boron, consisting of hydrogen and boron in chemical combination, and with an oxide of a metal of Group 6a of the Mendeleef Periodic Table, the concentrations of said hydride and oxide being each at least 0.001% by weight based on said olefin, effecting initial contacting at a low temperature at which substantial polymerization of said normally gaseous olefin does not occur, thereafter subjecting the resultant mixture to polymerization conditions including a suitable temperature between about 0° C. and about 200° C. and a suitable pressure, and separating a normally solid hydrocarbon material thus produced.

2. A process which comprises polymerizing olefin containing a terminal methylene group under polymerization conditions with a catalyst comprising essentially a product of the admixture of a hydride of boron, consisting of hydrogen and boron in chemical combination, with an oxide of a metal of Group 6a of the Mendeleef Periodic Table and recovering a high molecular weight solid polymer thus produced.

3. The process of claim 2 wherein said hydride of boron is diborane.

4. In a process for the production of a normally solid hydrocarbon material, the steps which comprise polymerizing a normally gaseous olefin under polymerization conditions, including a suitable temperature between about 0° C. and about 200° C. and a suitable pressure, with a catalyst comprising a hydride of boron, consisting of hydrogen and boron in chemical combination, in contact with an oxide of a metal of Group 6a of the Mendeleef Periodic Table, said hydride and oxide catalysts each being present in an operative proportion of at least about 0.001% by weight based on said olefin, and separating a normally solid hydrocarbon material thus produced.

5. The process of claim 4 in which said contacting effected in the presence of a liquid hydrocarbon reaction medium.

6. The process of claim 4 wherein said oxide is extended upon a solid supporting material.

7. The process of claim 6 wherein said oxide is partially pre-reduced while extended upon said solid supporting material.

8. The process of claim 4 wherein said olefin is ethylene.

9. The process of claim 4 wherein said olefin is propylene.

10. The process of claim 4 wherein a mixture comprising essentially ethylene and propylene constitute said normally gaseous olefin.

11. A process for the production of a normally solid polymer of high density from ethylene, which process comprises polymerizing ethylene in the presence of a liquid hydrocarbon reaction medium under polymerization conditions, including a suitable temperature between about 0° C. and about 200° C. and a suitable pressure, with a catalytic material prepared by admixing a hydride of boron, consisting of hydrogen and boron in chemical combination, with an oxide of a metal of Group 6a of the Mendeleef Periodic Table, said hydride and oxide catalysts each being present in an operative proportion of at least about 0.001% by weight based on said olefin, and separating a polymer having a density between about 0.95 and 0.99 from the effluents of reaction.

12. The process of claim 11 wherein said hydride of boron is diborane.

13. The process of claim 11 wherein said hydride of boron is diborane and said oxide is an oxide of molybdenum.

14. The process of claim 11 wherein said hydride of boron is diborane and said oxide is an oxide of chromium.

15. The process of claim 11 wherein said hydride of boron is diborane and said oxide is an oxide of tungsten.

16. The process of claim 11 wherein said hydride of boron is diborane and said oxide is an oxide of uranium.

17. A process for the production of a normally solid polymer of high density from propylene, which process comprises polymerizing propylene in the presence of a liquid hydrocarbon reaction medium under polymerization conditions, including a suitable temperature between about 0° C. and about 200° C. and a suitable pressure, with a catalytic material prepared by admixing a hydride of boron, consisting of hydrogen and boron in chemical combination, with an oxide of a metal of Group 6a of the Mendeleef Periodic Table, said hydride and oxide catalysts each being present in an operative proportion of at least about 0.001% by weight based on said olefin, and separating a polymer having a density between about 0.90 and about 0.96 from the effluents of reaction.

18. The process of claim 17 wherein said hydride of boron is diborane.

19. A composition of matter comprising essentially a material which is catalytically effective in the polymerization of a terminal vinyl olefin, said material being produced by contacting a hydride of boron consisting of hydrogen and boron in chemical combination with an oxide of a metal of Group 6a of the Mendeleef Periodic Table.

20. The composition of claim 19 wherein said hydride of boron is diborane and wherein said oxide is an oxide of molybdenum.

21. The composition of claim 19 wherein the weight ratio of said hydride of boron to said oxide of a metal of group 6a is within the range of about 0.0001 to about 10.

22. The process of claim 2 wherein said olefin is a normally gaseous olefin.

23. The composition of claim 19 wherein said contacting is effected in the presence of a normally gaseous olefin.

References Cited in the file of this patent

UNITED STATES PATENTS

| | | |
|---|---|---|
| 2,685,475 | Heiligmann | Aug. 3, 1954 |
| 2,728,758 | Field et al. | Dec. 27, 1955 |

OTHER REFERENCES

Chemical Abstracts, vol. 46, 1952, pages 5965–5966.